US010551912B2

(12) United States Patent
Zeng

(10) Patent No.: US 10,551,912 B2
(45) Date of Patent: Feb. 4, 2020

(54) METHOD AND APPARATUS FOR DISPLAYING DISPLAY OBJECT ACCORDING TO REAL-TIME INFORMATION

(71) Applicant: ALIBABA GROUP HOLDING LIMITED, Grand Cayman (KY)

(72) Inventor: Yuewei Zeng, Hangzhou (CN)

(73) Assignee: ALIBABA GROUP HOLDING LIMITED (KY)

( * ) Notice: Subject to any disclaimer, the term of this patent is extended or adjusted under 35 U.S.C. 154(b) by 0 days.

(21) Appl. No.: 15/993,071

(22) Filed: May 30, 2018

(65) Prior Publication Data

US 2018/0275750 A1    Sep. 27, 2018

Related U.S. Application Data

(63) Continuation of application No. PCT/CN2016/107014, filed on Nov. 24, 2016.

(30) Foreign Application Priority Data

Dec. 4, 2015 (CN) .......................... 2015 1 0884339

(51) Int. Cl.
*G06F 3/01* (2006.01)
*G06N 5/04* (2006.01)
(Continued)

(52) U.S. Cl.
CPC ............ *G06F 3/012* (2013.01); *G06F 3/0416* (2013.01); *G06F 3/04847* (2013.01); *G06K 9/00288* (2013.01); *G06N 5/046* (2013.01)

(58) Field of Classification Search
CPC .... G06F 3/012; G06F 3/04847; G06F 3/0416; G06F 3/0484; G06F 3/0488; G06N 5/046;
(Continued)

(56) References Cited

U.S. PATENT DOCUMENTS 5,594,469 A    1/1997  Freeman et al.
5,717,848 A    2/1998  Watanabe et al.
(Continued)

FOREIGN PATENT DOCUMENTS

CN    102830797 A    12/2012
CN    103376994 A    10/2013
(Continued)

OTHER PUBLICATIONS

Australian Examination Report No. 1 dated Mar. 5, 2019 for Australian Patent Application No. 2016363434 (6 pages).
(Continued)

*Primary Examiner* — John T Repsher, III

(57) ABSTRACT

A disclosed method for displaying a display object according to real-time information may comprise: acquiring location information of a display object corresponding to real-time information for each of multiple periods; determining a starting point according to the location information acquired in a previous period, and determining a finishing point according to the location information acquired in a current period; displaying the display object as sliding between the starting point and the finishing point.

19 Claims, 5 Drawing Sheets

(51) Int. Cl.
  *G06K 9/00* (2006.01)
  *G06F 3/0484* (2013.01)
  *G06F 3/041* (2006.01)
  *G06F 3/0488* (2013.01)

(58) Field of Classification Search
  CPC .......... G06K 9/00288; G06K 9/00335; G06K 9/00228
  See application file for complete search history.

(56) References Cited

U.S. PATENT DOCUMENTS

| | | | |
|---|---|---|---|
| 7,607,111 | B2 | 10/2009 | Vaananen et al. |
| 2006/0187196 | A1 | 8/2006 | Underkoffler et al. |
| 2007/0067798 | A1 | 3/2007 | Wroblewski |
| 2009/0310831 | A1 | 12/2009 | Zhang et al. |
| 2011/0208422 | A1 | 8/2011 | Nakano et al. |
| 2011/0227812 | A1 | 9/2011 | Haddick et al. |
| 2011/0286640 | A1 | 11/2011 | Kwon et al. |
| 2012/0051596 | A1* | 3/2012 | Darnell ............... G06F 3/017 382/103 |
| 2012/0256967 | A1 | 10/2012 | Baldwin et al. |
| 2013/0015946 | A1 | 1/2013 | Lau et al. |
| 2013/0063589 | A1 | 3/2013 | Jiang et al. |
| 2013/0234825 | A1 | 9/2013 | Malhotra et al. |
| 2014/0033140 | A1 | 1/2014 | Zeng |
| 2014/0075528 | A1* | 3/2014 | Matsuoka ............... G06F 21/32 726/7 |
| 2014/0089823 | A1 | 3/2014 | Kang |
| 2014/0126782 | A1 | 5/2014 | Takai et al. |
| 2014/0132643 | A1 | 5/2014 | Yamazaki et al. |
| 2014/0153173 | A1 | 6/2014 | Pombo et al. |
| 2014/0169642 | A1 | 6/2014 | Law et al. |
| 2014/0191964 | A1 | 7/2014 | Mcdonald et al. |
| 2014/0225898 | A1* | 8/2014 | Fyke .................. G06T 11/00 345/473 |
| 2014/0294259 | A1 | 10/2014 | Lee |
| 2014/0355830 | A1 | 12/2014 | Park et al. |
| 2015/0022447 | A1 | 1/2015 | Hare et al. |
| 2015/0074615 | A1 | 3/2015 | Han et al. |
| 2015/0309568 | A1 | 10/2015 | Miki |
| 2015/0346489 | A1 | 12/2015 | Lindley et al. |
| 2016/0335483 | A1* | 11/2016 | Pfursich ............ G06K 9/00899 |
| 2016/0371812 | A1 | 12/2016 | Tsukamoto et al. |

FOREIGN PATENT DOCUMENTS

| | | |
|---|---|---|
| CN | 103425403 A | 12/2013 |
| CN | 103703438 A | 4/2014 |
| CN | 103809743 A | 5/2014 |
| CN | 103941988 A | 7/2014 |
| CN | 104777984 A | 7/2015 |
| CN | 104915001 A | 9/2015 |
| CN | 104915099 A | 9/2015 |
| CN | 104951773 A | 9/2015 |
| EP | 2521370 A1 | 11/2012 |
| JP | 2007034793 A | 2/2007 |
| JP | 2011134278 A | 7/2011 |
| JP | 2011-191289 A | 9/2011 |
| JP | 2012008893 A | 1/2012 |
| JP | 2015012304 A | 1/2015 |
| JP | 2015162071 A | 9/2015 |
| JP | 2015165404 A | 9/2015 |
| JP | 2015173806 A | 10/2015 |
| WO | 2012133254 A2 | 10/2012 |
| WO | 2013/055571 A1 | 4/2013 |
| WO | 2014/000513 A1 | 1/2014 |

OTHER PUBLICATIONS

PCT International Preliminary Report on Patentability dated Jun. 5, 2018, issued in International Application No. PCT/CN2016/107014 (7 pages).
International Search Report and Written Opinion for Application No. PCT/CN2016/107014, dated Jan. 25, 2017, 9 pages.
Australian Examination Report No. 2 dated Aug. 13, 2019 for Australian Patent Application No. 2016363434 (4 pages).
First Office Action and Search Report for Chinese Application No. 201510884339.7 dated Jul. 3, 2019 (6 pages).
Office Action for Japanese Patent Application No. 2018-528716 dated Apr. 2, 2019 (10 pages).
Extended Search Report for European Application No. 16869907.2 dated May 27, 2019 (7 pages).
Office Action for Japanese Patent Application No. 2018-528716 dated Sep. 24, 2019 (3 pages).
Decision for Grant for Japanese Patent Application No. 2018-528716 dated Nov. 26, 2019 with English machine translation (4 pages).

* cited by examiner

METHOD AND APPARATUS FOR DISPLAYING DISPLAY OBJECT ACCORDING TO REAL-TIME INFORMATION

CROSS REFERENCE TO RELATED APPLICATIONS

The present application is a continuation application of International Patent Application No. PCT/CN2016/107014, filed on Nov. 24, 2016, which claims priority to Chinese Patent Application No. 201510884339.7 filed on Dec. 4, 2015 and entitled "Method and Apparatus for Displaying Display Object According to Real-Time Information." The above-referenced applications are incorporated herein by reference in their entirety.

TECHNICAL FIELD

The present application relates to the field of computer and network technologies, and in particular, to a method and an apparatus for displaying a display object according to real-time information.

BACKGROUND

As cameras, gyroscopes, accelerometers, distance sensors, and other devices have been widely applied to terminals, application programs can use these devices that provide real-time information to achieve new functions or to achieve existing functions in a brand-new manner. In some implementations, when the real-time information changes, a display object on a screen can be made to change accordingly, which leads to interaction with a user and brings an intuitive and novel experience to the user.

In these implementations, in addition to that a display object itself can change along with the real-time information, the display location of the display object on the screen can also be made to change according to the real-time information. For example, the location where a ball is to be displayed on a screen can be determined according to the location of a user's hand in a real-time video, as if the user holds the ball in hand.

In current technologies, an application program extracts, for a period, real-time information that is output from a sensor or another device, maps the real-time information to a corresponding display location on a screen according to a preset algorithm, and displays a display object at the display location on the screen. As such, when the real-time information changes from period to period, the display object will be displayed at a new display location on the screen and move once in each period, and it looks as if the display object moves step by step.

According to such implementation manner, the location of the display object on the screen changes greatly when relatively large changes occur to the real-time information, and it looks as if the display object jumps on the screen; when the real-time information experiences very small changes for several periods in a row, it looks as if the display object is shaking on the screen. The display effect is undesirable in both situations.

SUMMARY

To at least mitigate the disadvantages of current technologies, according to one aspect, a disclosed method for displaying a display object according to real-time information may comprise: acquiring location information of a display object corresponding to real-time information for each of multiple periods; determining a starting point according to the location information acquired in a previous period, and determining a finishing point according to the location information acquired in a current period; displaying the display object as sliding between the starting point and the finishing point.

According to another aspect, a disclosed apparatus for displaying a display object according to real-time information may comprise: a location information acquiring unit configured to acquire location information corresponding to real-time information for each of multiple periods; a starting and finishing points determining unit configured to determine a starting point according to the location information acquired in a previous period, and determine a finishing point according to the location information acquired in a current period; a sliding display unit configured to display a display object as sliding between the starting point and the finishing point.

According to another aspect, a non-transitory computer-readable storage medium may store instructions that, when executed by a processor, cause the processor to perform a method for displaying a display object according to real-time information, the method comprising: acquiring location information of a display object corresponding to real-time information for each of multiple periods; determining a starting point according to the location information acquired in a previous period, and determining a finishing point according to the location information acquired in a current period; and displaying the display object as sliding between the starting point and the finishing point.

According to another aspect, a system for displaying a display object according to real-time information may comprise a processor and a non-transitory computer-readable storage medium storing instructions that, when executed by the processor, cause the system to perform a method for displaying a display object according to real-time information. The method may comprise: acquiring location information of a display object corresponding to real-time information for each of multiple periods; determining a starting point according to the location information acquired in a previous period, and determining a finishing point according to the location information acquired in a current period; and displaying the display object as sliding between the starting point and the finishing point.

According to the technical solutions above, starting and finishing points are determined according to location information corresponding to real-time information in two consecutive periods, and a display object is displayed as sliding between the starting point and the finishing point, such that the displayed display object smoothly slides from the starting point to the finishing point, thereby preventing the undesirable effects of jumping when relatively large changes occur to real-time information and shaking when very small changes occur to real-time information, and improving the display effect of display objects.

DETAILED DESCRIPTION

Embodiments of the present disclosure provide a novel method for displaying a display object according to real-time information. The method displays, between screen display locations corresponding to real-time information in two consecutive periods, sliding from the display location corresponding to the previous period to the display location corresponding to the current period in an animated manner. The display object displayed in such a manner will not appear jumping or shaking due to overly large or overly small changes to real-time information, and the display effect is improved, thereby solving the problem in the current technologies.

Embodiments of the present disclosure can be applied to a device that can acquire real-time information for determining a location to display a display object and has computation and storage capabilities. The device may include a cell phone, a tablet computer, a PC (Personal Computer), a laptop computer, a server, and the like. The device can read real-time information from a sensor or a camera of its own or can continuously acquire real-time information of a target object from other devices via a network. Real-time information comprises any parameter that varies with time and can be collected by a device, such as a moving speed of an object in a real-time video, a grayscale of a real-time image, various real-time variables in industrial control processes, real-time positioning data of a terminal, and the like. In addition, a display object can be a non-real-time image or video or can be a real-time image and/or real-time video. There is no limitation to types and sources of real-time information, or specific types of display objects in the embodiments of the present disclosure.

Figure 1:
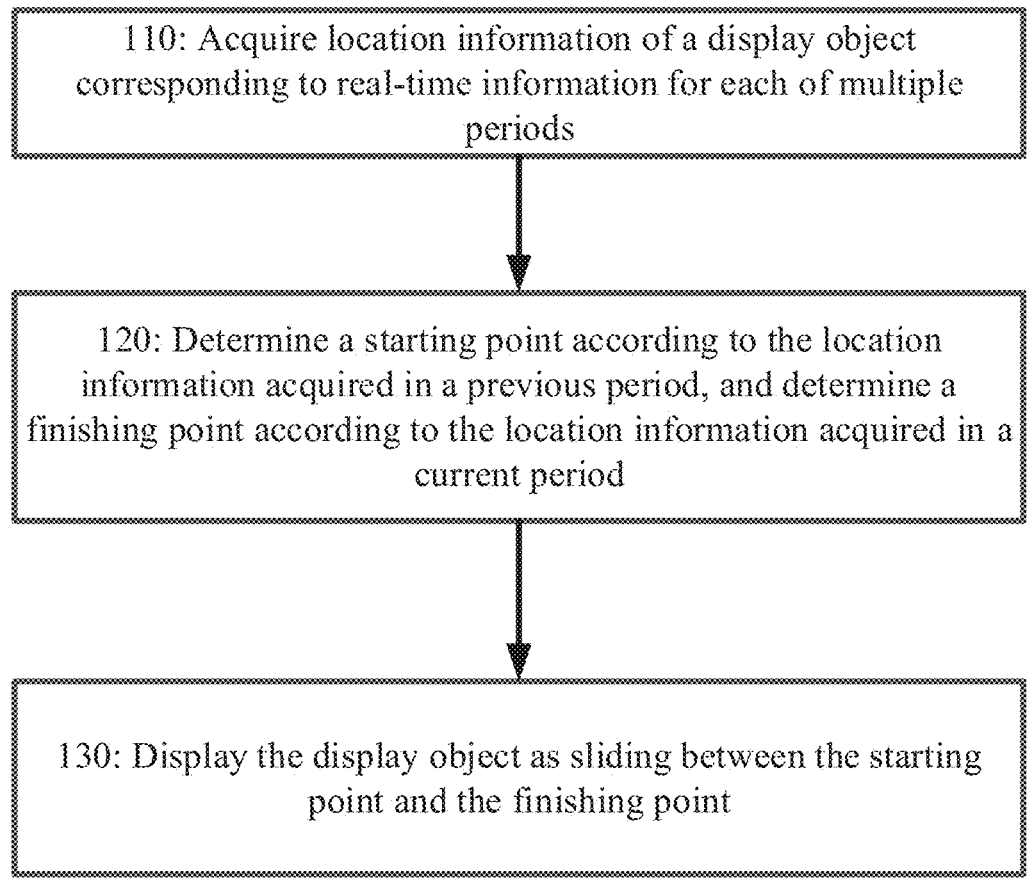
FIG. 1 is a flow chart of a method for displaying a display object according to real-time information, consistent with various embodiments of the present disclosure.

In some embodiments, the flow of displaying a display object according to real-time information is shown in FIG. 1. The main body that carries out the flow can be an application program, a process or thread in an application program, a service, or a process or thread in a service.

Step 110, acquiring location information of a display object corresponding to real-time information for each of multiple periods.

Depending on a specific implementation of a practical application scenario, the location information can be coordinates of a screen position that matches the screen size of a display object, or other parameters that can be used to determine coordinates of a screen position (e.g., screen ratio coordinates). The main body can read real-time information from a sensor or a camera of the device where the main body is located for a certain period or acquire real-time information from a network, and then obtain corresponding location information by using the real-time information as an input for a preset algorithm. Alternatively, the main body can obtain location information corresponding to the real-time information directly from the network, which is not limited in the embodiments of the present disclosure.

Conventional methods for generating location information corresponding to real-time information can be used, which will not be repeated herein.

Step 120, determining a starting point according to the location information acquired in a previous period, and determining a finishing point according to the location information acquired in a current period.

If the acquired location information comprises coordinates of a screen position that matches the screen size of a display object, the location information in the previous period is directly used as a starting point, and the location information in the current period is directly used as a finishing point; otherwise, according to a relationship between location information and screen position coordinates, the location information in the previous period is converted to coordinates of a screen position that is then used as a starting point, and the location information in the current period is converted to coordinates of a screen position that is then used as a finishing point.

The method for converting location information to coordinates of a screen position may be different in different application scenarios. For example, location information acquired in each period is screen ratio coordinates (sX, sY), wherein sX is an X-axis ratio coordinate in a range of [0, 1), indicating a ratio of a location's X-axis screen coordinate to the maximum value of the X-axis; sY is a Y-axis ratio coordinate in a range of [0, 1), indicating a ratio of a location's Y-axis screen coordinate to the maximum value of the Y-axis. According to the width and length of a screen of a display object, sX and sY can be converted to the X-axis coordinate x and the Y-axis coordinate y of coordinates of the screen location. In one example, assuming that the current screen has a total width W and a total length H, then the coordinates of the screen location converted from (sX, sY) are (sX*W, Sy*H), which have the same units as those of W and H, e.g., pixels or mm.

Step 130, displaying the display object as sliding between the starting point and the finishing point.

After the starting point and the finishing point of the current period are determined, the sliding display in the current period can be performed to gradually move the display object from the starting point to the finishing point in an animated manner, as if the display object slides from the starting point to the finishing point. Various technical means for dynamic imaging and animations according to the prior art can be referred to for methods for sliding display, which is not limited in the embodiments of the present disclosure.

Figure 2:
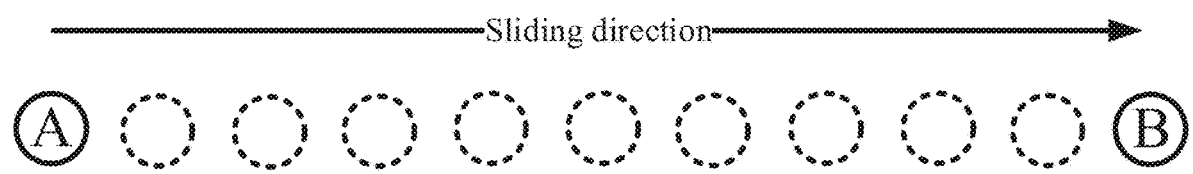
FIG. 2 is a schematic diagram of a distribution of spread points in an evenly spreading manner, consistent with various embodiments of the present disclosure.
Figure 3:
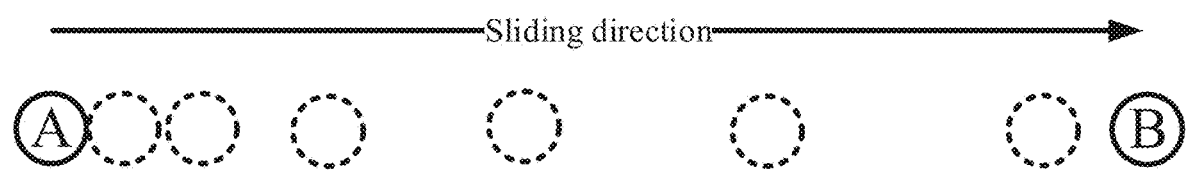
FIG. 3 is a schematic diagram of a distribution of spread points in an accelerated spreading manner, consistent with various embodiments of the present disclosure.
Figure 4:
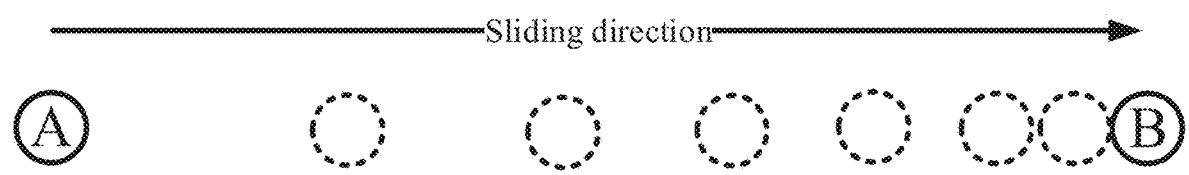
FIG. 4 is a schematic diagram of a distribution of spread points in a decelerated spreading manner, consistent with various embodiments of the present disclosure.

In one example, a sliding track of the display object between the starting point and the finishing point can be determined first, and N (N is a natural number) spread location points can be selected on the sliding track. Subsequently, the display object is displayed at the starting point, N spread location points, and the finishing point sequentially for a certain single-point display duration to achieve the sliding effect. Here, the sliding track can be a straight line or a curved line. The spread points can be selected in a manner according to a desired sliding display effect, e.g., an evenly, accelerated, or decelerated spreading manner. Assuming that A is the starting point, B is the finishing point, and the sliding track between A and B is a straight line, spread points in an evenly spreading manner are evenly distributed between A and B, as shown in FIG. 2; spread points in an accelerated spreading manner have a gradually increasing distance therebetween in a direction from A to B, as shown in FIG. 3; spread points in a decelerated spreading manner have a gradually decreasing distance therebetween in a direction from A to B, as shown in FIG. 4.

In the above example, the sliding track, the N value, the manner in which spread points are selected, and the single-point display duration may be identical or different in each period. When each period has different sliding tracks, N values, manners in which spread points are selected, and/or single-point display durations, several preset options may be polled or one option is randomly selected therefrom, or a specific sliding track, a specific N value, a manner in which spread points are selected, and/or a single-point display duration will be determined according to location information or changes to location information, which are not limited in the embodiments of the present disclosure.

For example, the N value and single-point display duration can be selected according to a sliding distance of a display object in the current period (which is determined by the location information in the previous period, the location information in the current period, and the sliding track in the current period). If the sliding distance is long, the N value is increased, and the single-point display duration is decreased; if the sliding distance is short, the N value is decreased, and the single-point display duration is increased, thereby achieving a better display effect.

A display object may have its own shape and take up a certain screen display area. The displaying the display object at the starting point, the finishing point, and spread points in the embodiments of the present disclosure may refer to that the starting point, the finishing point, or spread points are used to position a fixed point of the display object, e.g., a central point, a top left border point, and the like.

In some embodiments, a total sliding duration in a period, i.e., the time required for a display object to slide from the starting point to the finishing point, can be greater than, shorter than, or equal to the length of the period. In other words, when the current period begins, the sliding display of the display object in the previous period may have ended, just end, or have not ended.

If the sliding display of the display object in the previous period has not ended when the current period begins, the starting point of the current period can be changed to the display location of the display object when the current period begins, and the portion of the sliding display in the previous period that has not been completed is cancelled. As such, the display object will slide from the display location when the current period begins (i.e., a middle location in the sliding process of the previous period) to the finishing point, such that the display location can more promptly reflect changes to real-time information and a display effect that the display object slides smoothly can still be achieved.

In some application scenarios, machine learning algorithms are used in the process to obtain corresponding location information from real-time information. For example, in applications where location information is determined according to some characteristic values of real-time videos taken by a camera, neural network algorithms can be used for recognition of video characteristic values. Since real-time information collected each time and processing results are all used to correct the algorithms, there may be small differences in location information output by the algorithms when the previous period and the current period have exactly the same real-time information. As a result, it would often give users a feeling that the display object is not stable.

To avoid this situation, after a starting point and a finishing point of the sliding in the current period are determined, whether the distance between the starting point and the finishing point is shorter than a predetermined threshold can be determined. If yes, the display object is displayed at the current location, and the sliding display in the current period is no longer performed. In some embodiments, the selection of the predetermined threshold can be determined according to the impact that a self-learning process of a machine learning algorithm may have on location information.

Therefore, in the embodiments, location changes of a display object in each period are displayed in a sliding display manner. The starting point and the finishing point of the sliding display are determined according to location information corresponding to real-time information in two consecutive periods, such that the displayed display object moves smoothly from the starting point to the finishing point, thereby preventing jumping or shaking effects of the display object due to overly large or overly small changes to real-time information and improving the display effect.

Figure 5:
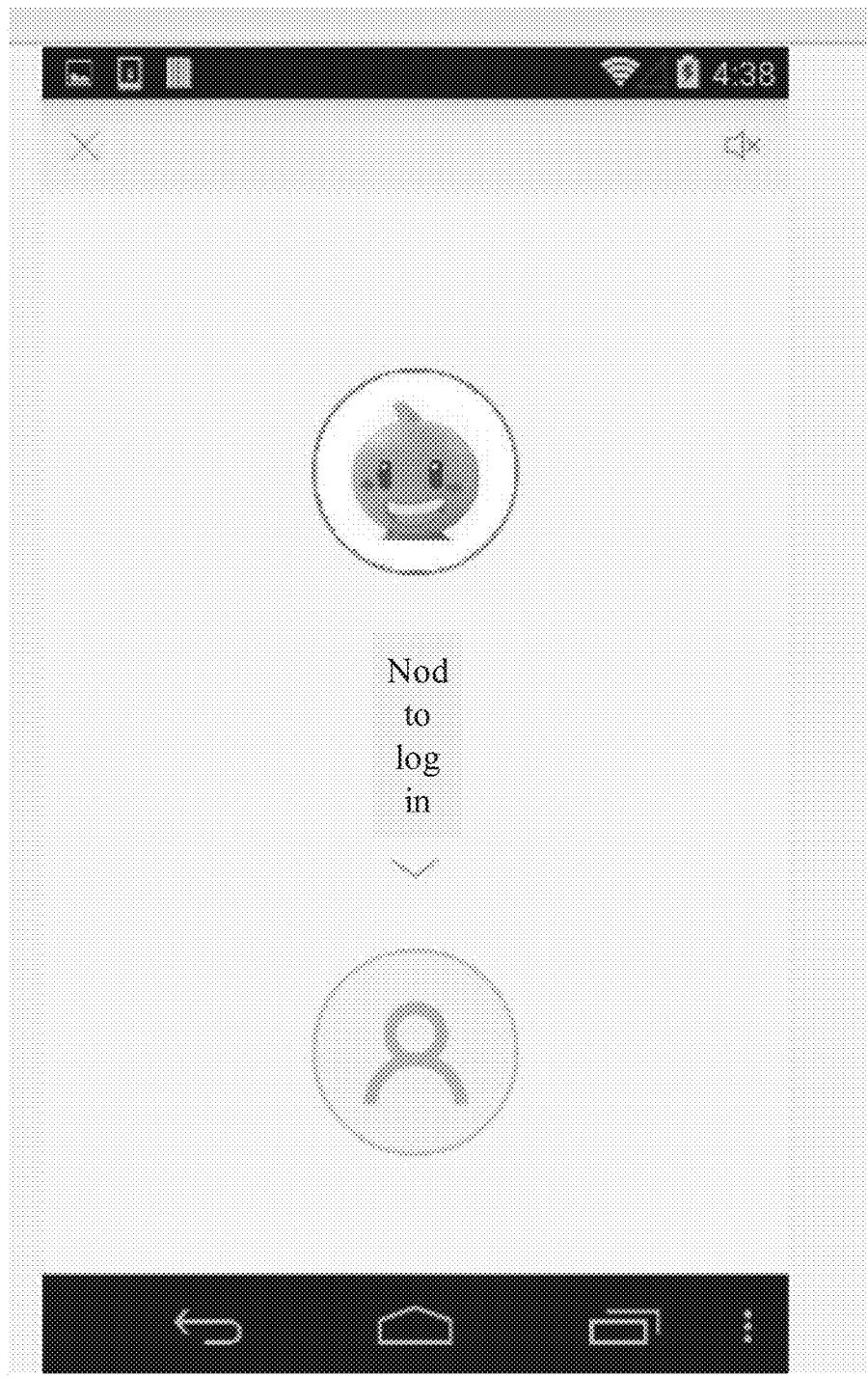
FIG. 5 is a schematic diagram of a face login interface, consistent with various embodiments of the present disclosure.

In an application example of the present disclosure, a terminal App (application program) uses face verification login, which has a login interface shown in FIG. 5. The App uses a face recognition technology to extract a head image of a user from real-time videos from a terminal camera, use the user's real-time head image as the display object, and display the same in a circle. The display location of the user's real-time head image on the screen is determined by degrees of yaw and pitch of the real-time head image.

In one example, the App uses a neural network algorithm to recognize a rotation angle in the horizontal direction and a rotation angle in the vertical direction of the front of a user's real-time head image, and makes the rotation angle in the horizontal direction correspond to the X-axis ratio coordinate sX and the rotation angle in the vertical direction correspond to the Y-axis ratio coordinate sY. For example, when the recognized user's real-time head image is a front head image in the horizontal direction and the vertical direction, the corresponding ratio coordinates are (0.5, 0.5), and the user's real-time head image will be displayed in the center of the screen; when the recognized user's real-time head image is a left side in the horizontal direction and a frontal in the vertical direction, the corresponding ratio coordinates are (0, 0.5), and the user's real-time head image will be displayed in the center of the left screen border.

As such, when the user changes degrees of yaw and pitch of his/her head, the user's real-time head image on the login interface shown in FIG. 5 changes its display location accordingly. For example, the user can make the real-time head image to move to the right of the screen by turning head to the right, or make the real-time head image to move downwardly on the screen by lowering the head. When the user's real-time head image moves to a predetermined marked location on the lower half of the screen, the App performs face verification on the user's real-time head image to verify the user's real-time head image, and the user's login is completed when the verification is successful.

Figure 6:
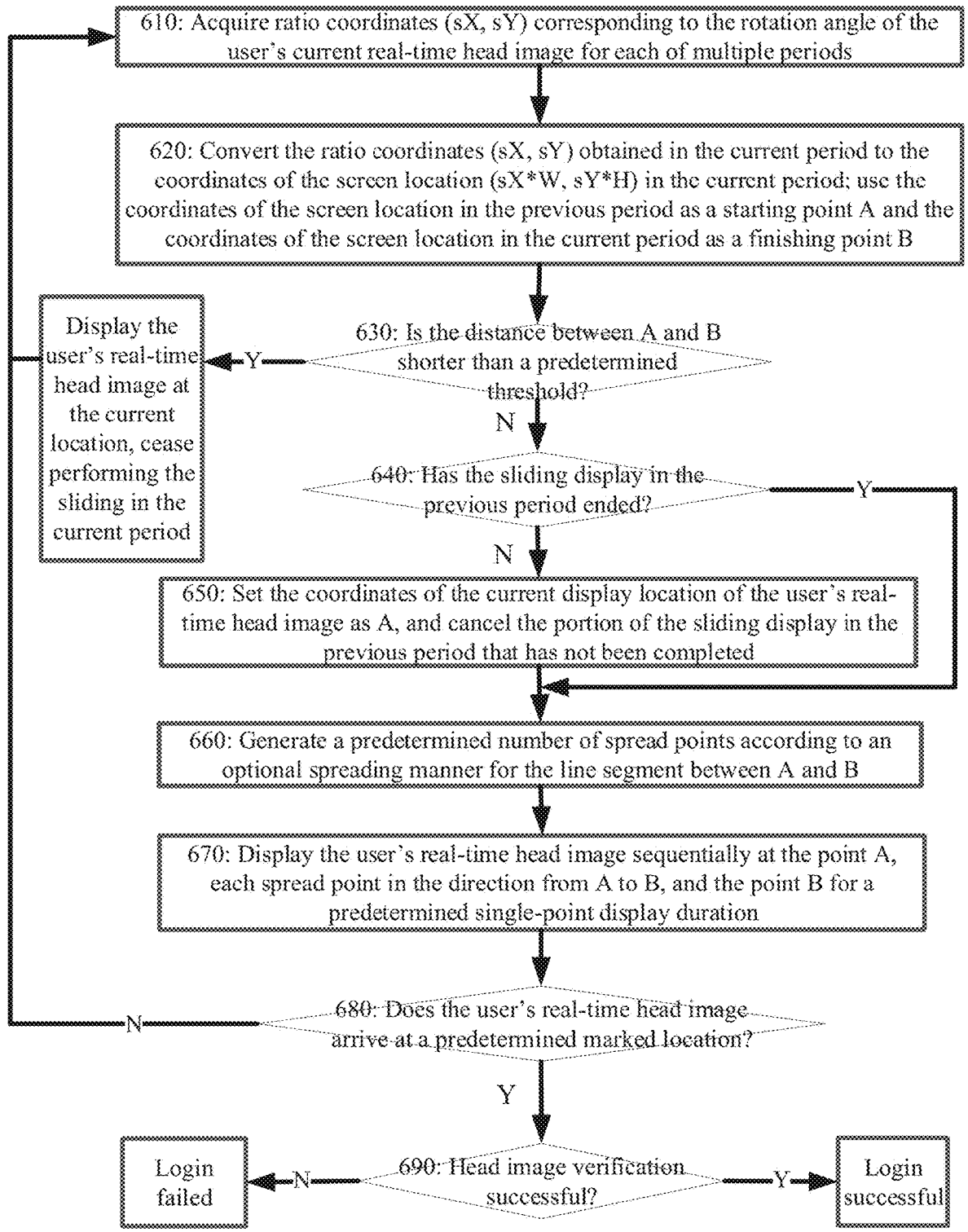
FIG. 6 is a flow chart of displaying a real-time head image of a user, consistent with various embodiments of the present disclosure.

When the App recognizes that a face is included in the real-time video, the flow shown in FIG. 6 may be used to implement the sliding of the user's real-time head image.

Step 610, reading outputs by a neural network algorithm for each of multiple periods, and obtaining ratio coordinates (sX, sY) corresponding to the rotation angle in the horizontal direction and the rotation angle in the vertical direction of the user's current real-time head image.

Step 620, converting the ratio coordinates (sX, sY) obtained in the current period to the coordinates of the screen location (sX*W, sY*H) in the current period; using the coordinates of the screen location in the previous period as a starting point A and the coordinates of the screen location in the current period as a finishing point B.

Step 630, determining whether the distance between A and B is shorter than a predetermined threshold; if yes, continuing to display the user's real-time head image at the current location, ceasing performing the sliding display in the current period, and proceeding to Step 610 to wait for location information of the next period; if no, proceeding to Step 640.

Step 640, determining whether the sliding display in the previous period has ended; if yes, proceeding to Step 660; if no, proceeding to Step 650.

Step 650, setting the coordinates of the current display location of the user's real-time head image as the starting point A, and cancelling the portion of the sliding display in the previous period that is after the current location and has not been completed.

Step 660, selecting any one of the evenly, accelerated, and decelerated spreading manners, and generating a predetermined number of spread points according to the selected spreading manner for the line segment between A and B.

Step 670, displaying the user's real-time head image sequentially at the point A, each spread point in the direction from A to B, and the point B for a predetermined single-point display duration, to achieve a display effect of the user's real-time head image sliding from the point A to the point B.

Step 680, determining whether the user's real-time head image arrives at a predetermined marked location; if yes, proceeding to Step 690; if no, proceeding to Step 610 to perform processing for the next period.

Step 690, performing face verification on the user's real-time head image; if successful, completing the user's login; if failed, the user's login fails.

Figure 7:
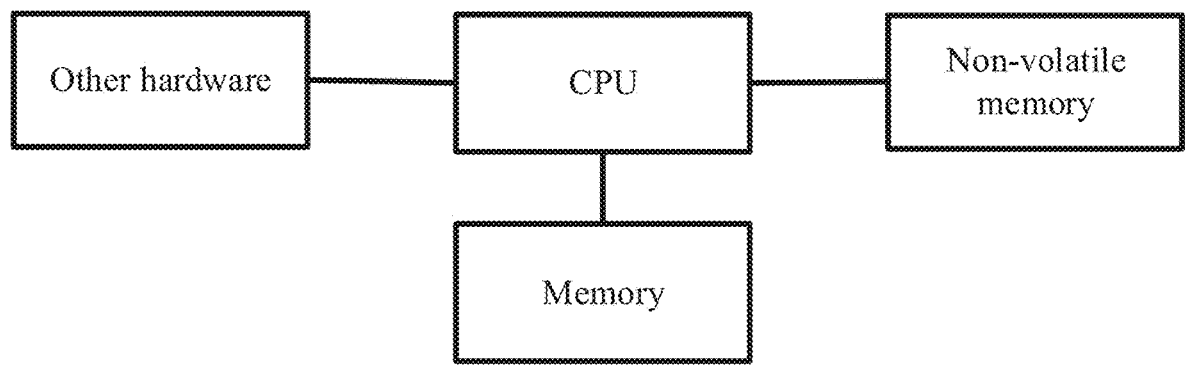
FIG. 7 is a hardware structural diagram of a terminal or server, consistent with various embodiments of the present disclosure.

Corresponding to the above flow, the embodiments of the present disclosure further provide an apparatus for displaying a display object according to real-time information. The apparatus can be achieved through software, through hardware, or through a combination of software and hardware. With software implementation as an example, the apparatus in the logical sense is formed by reading a corresponding computer program instruction into a memory for running through a CPU (Central Process Unit) of a terminal or server. From a hardware level, in addition to the CPU, memory, and non-volatile memory shown in FIG. 7, the terminal where the apparatus is located may further comprise other hardware, such as a chip for wireless signal receiving and transmission, and the server where the apparatus is located may further comprise other hardware, such as a board for achieving network communication functions.

Figure 8:
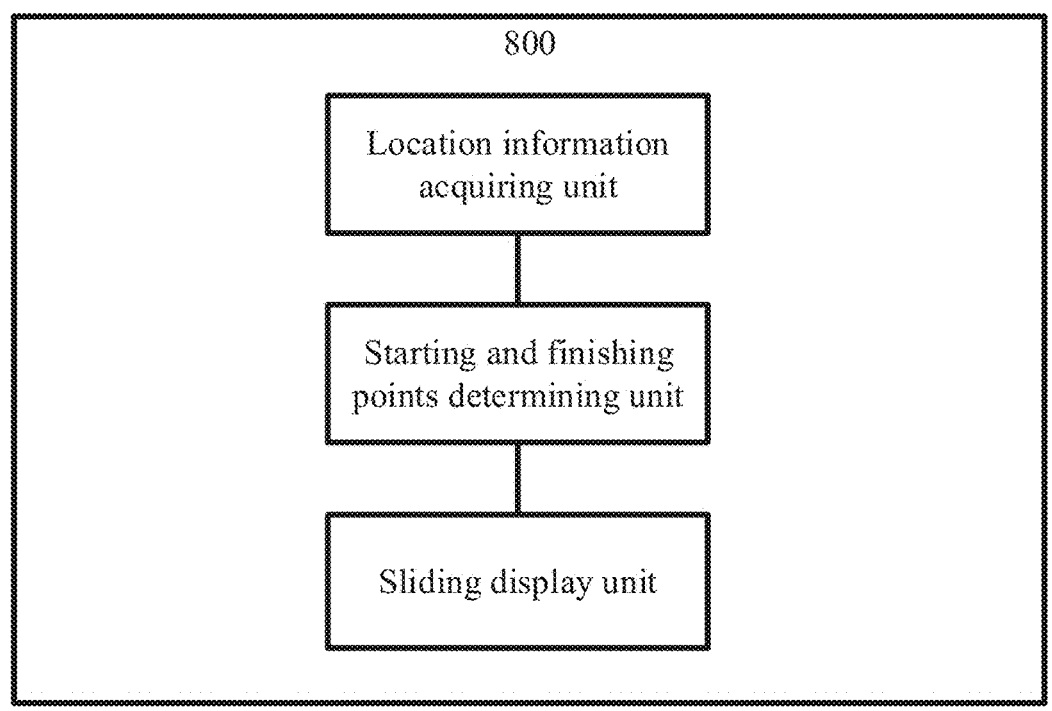
FIG. 8 is a logical structural diagram of an apparatus for displaying a display object according to real-time information, consistent with various embodiments of the present disclosure.

FIG. 8 illustrates an apparatus 800 for displaying a display object according to real-time information in an embodiment of the present disclosure, comprising a location information acquiring unit, a starting and finishing points determining unit, and a sliding display unit, wherein the location information acquiring unit is configured to acquire location information of a display object corresponding to real-time information for each of multiple periods; the starting and finishing points determining unit is configured to determine a starting point according to the location information acquired in a previous period, and determine a finishing point according to the location information acquired in a current period; the sliding display unit is configured to display the display object as sliding between the starting point and the finishing point.

Optionally, the apparatus further comprises a starting point changing unit configured to change, in the case where the sliding display in the previous period has not ended when the current period begins, the starting point to the display location of the display object when the current period begins, and cancel the portion of the sliding display in the previous period that has not been completed.

Optionally, the apparatus 800 further comprises a sliding cancelling unit configured to display the display object at the current location if the distance between the starting point and the finishing point is shorter than a predetermined threshold, and cease performing the sliding display in the current period.

In one example, the sliding display unit can comprise a spread point determining module and a spread point displaying module, wherein the spread point determining module is configured to determine a sliding track of a display object between the starting point and the finishing point, and to select N spread location points on the sliding track. N is a natural number. The spread point displaying module is configured to display the display object at the starting point, the N spread location points, and the finishing point sequentially for a certain single-point display duration to achieve a sliding effect.

In the above example, the spread point determining module can be configured to determine a sliding track of a display object between the starting point and the finishing point, and to select N spread location points on the sliding track in an evenly, accelerated, or decelerated spreading manner.

Optionally, the display object comprises a real-time image and/or a real-time video.

In some embodiments, the display object comprises a user's real-time head image video; the location information corresponding to real-time information comprises: an X-axis ratio coordinate corresponding to a rotation angle of the front of the user's real-time head image in the horizontal direction and a Y-axis ratio coordinate corresponding to a rotation angle of the front of the user's real-time head image in the vertical direction; the starting and finishing points determining unit is configured to convert, according to the width and length of a screen, the X-axis ratio coordinate and the Y-axis ratio coordinate of the previous period to location coordinates of the starting point on the screen, and convert, according to the width and length of the screen, the X-axis ratio coordinate and the Y-axis ratio coordinate of the current period to location coordinates of the finishing point on the screen.

In some embodiments, the apparatus 800 can further comprise a verification and login unit configured to perform verification on the user's real-time head image when the display object moves to a predetermined marked location on the screen, and to complete the user's login when the verification is successful.

In some embodiments, the various modules and units of the apparatus 800 may be implemented as software instructions. That is, the apparatus 800 may comprise a processor and a non-transitory computer-readable storage medium storing instructions that, when executed by the processor, cause the apparatus 800 to performed various steps and methods of the modules and units described above. The apparatus 800 may also be referred to as a system for displaying a display object according to real-time information. In some embodiments, the apparatus 800 may include a cell phone, a tablet computer, a PC, a laptop computer, a server, etc. The apparatus 800 may also include the screen described herein.

The embodiments described above are merely exemplary and are not used to limit the present application. Any modification, equivalent substitution, or improvement made within the spirit and principle of the present disclosure shall fall within the scope of the present disclosure.

In some embodiments, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs), or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

The terms of "including," "comprising," or any other variants thereof intend to encompass a non-exclusive inclusion, such that a process, method, commodity or device comprising a series of elements not only comprises these elements, but also comprises other elements that are not clearly listed, or further comprises elements that are inherent to the process, method, commodity or device. When there is no further restriction, elements defined by the statement "comprising one . . . " does not exclude additional similar elements in a process, method, commodity, or device that comprises the defined elements.

A person skilled in the art should understand that the embodiments of the present disclosure may be provided as a method, a system, or a computer program product. Therefore, the present disclosure may be implemented as a complete hardware embodiment, a complete software embodiment, or an embodiment combining software and hardware. Moreover, the present disclosure may be implemented in the form of a computer program product implemented on one or more computer usable storage media (including, but not limited to, a magnetic disk memory, CD-ROM, an optical memory, and the like) comprising computer usable program codes therein.

What is claimed is:

1. A method for displaying a display object according to real-time information, comprising:
    acquiring location information of the display object, the location information comprising real-time location information acquired in a previous period and real-time location information acquired in a current period;
    determining a starting point according to the real-time location information acquired in the previous period, and determining a finishing point according to the real-time location information acquired in the current period; and
    displaying the display object as sliding between the starting point and the finishing point, comprising:
        determining a sliding track of the display object between the starting point and the finishing point, and selecting N spread location points on the sliding track, N being a natural number; and
        displaying the display object at the starting point, the N spread location points, and the finishing point sequentially for a single-point display duration to achieve a sliding effect,
            wherein a value of N varies directly with a sliding distance of the display object in the current period and inversely with the single-point display duration.

2. The method according to claim 1, further comprising:
    if a sliding display in the previous period has not ended when the current period begins, changing the starting point to a display location of the display object when the current period begins; and
    cancelling an uncompleted portion of the sliding display in the previous period.

3. The method according to claim 1, further comprising:
    displaying, at the real-time location information acquired in the current period, the display object, if a distance between the starting point and the finishing point is shorter than a predetermined threshold; and
    ceasing performing the sliding display in the current period.

4. The method according to claim 1, wherein the selecting the N spread location points on the sliding track comprises:
    selecting the N spread location points on the sliding track in an evenly, accelerated, or decelerated spreading manner.

5. The method according to claim 1, wherein the display object comprises at least one of a real-time image or a real-time video.

6. The method according to claim 1, wherein:
    the display object comprises a user's real-time head image video;
    the location information comprises: an X-axis ratio coordinate corresponding to a rotation angle of a front of the user's real-time head image in a horizontal direction and a Y-axis ratio coordinate corresponding to a rotation angle of the front of the user's real-time head image in a vertical direction; and
    the determining the starting point according to the real-time location information acquired in the previous period, and determining the finishing point according to the real-time location information acquired in the current period comprises: converting, according to a width and a length of a screen, a X-axis ratio coordinate and a Y-axis ratio coordinate of the previous period to location coordinates of the starting point on the screen, and converting, according to the width and the length of the screen, a X-axis ratio coordinate and a Y-axis ratio coordinate of the current period to location coordinates of the finishing point on the screen.

7. The method according to claim 6, further comprising: performing verification on the user's real-time head image when the display object moves to a predetermined marked location on the screen, and completing the user's login when the verification is successful.

8. A non-transitory computer-readable storage medium storing instructions that, when executed by a processor, cause the processor to perform a method for displaying a display object according to real-time information, the method comprising:
- acquiring location information of the display object, the location information comprising real-time location information acquired in a previous period and real-time location information acquired in a current period;
- determining a starting point according to the real-time location information acquired in the previous period, and determining a finishing point according to the real-time location information acquired in the current period; and
- displaying the display object as sliding between the starting point and the finishing point, comprising:
  - determining a sliding track of the display object between the starting point and the finishing point, and selecting N spread location points on the sliding track, N being a natural number; and
  - displaying the display object at the starting point, the N spread location points, and the finishing point sequentially for a single-point display duration to achieve a sliding effect,
    - wherein a value of N varies directly with a sliding distance of the display object in the current period and inversely with the single-point display duration.

9. The non-transitory computer-readable storage medium according to claim 8, wherein the method further comprises:
- if a sliding display in the previous period has not ended when the current period begins, changing the starting point to a display location of the display object when the current period begins, and cancelling an uncompleted portion of the sliding display in the previous period.

10. The non-transitory computer-readable storage medium according to claim 8, wherein the method further comprises:
- displaying, at the real-time location information acquired in the current period, the display object, if a distance between the starting point and the finishing point is shorter than a predetermined threshold, and ceasing performing a sliding display in the current period.

11. The non-transitory computer-readable storage medium according to claim 8, wherein the selecting the N spread location points on the sliding track comprises: selecting the N spread location points on the sliding track in an evenly, accelerated, or decelerated spreading manner.

12. The non-transitory computer-readable storage medium according to claim 8, wherein the display object comprises at least one of a real-time image or a real-time video.

13. The non-transitory computer-readable storage medium according to claim 8, wherein:
- the display object comprises a user's real-time head image video;
- the location information comprises: an X-axis ratio coordinate corresponding to a rotation angle of a front of the user's real-time head image in a horizontal direction and a Y-axis ratio coordinate corresponding to a rotation angle of the front of the user's real-time head image in a vertical direction; and
- the determining the starting point according to the real-time location information acquired in the previous period, and determining the finishing point according to the real-time location information acquired in the current period comprises: converting, according to a width and a length of a screen, a X-axis ratio coordinate and a Y-axis ratio coordinate of the previous period to location coordinates of the starting point on the screen, and converting, according to the width and the length of the screen, a X-axis ratio coordinate and a Y-axis ratio coordinate of the current period to location coordinates of the finishing point on the screen.

14. The non-transitory computer-readable storage medium according to claim 13, wherein the method further comprises: performing verification on the user's real-time head image when the display object moves to a predetermined marked location on the screen, and completing the user's login when the verification is successful.

15. A system for displaying a display object according to real-time information, comprising a processor and a non-transitory computer-readable storage medium storing instructions that, when executed by the processor, cause the system to perform a method for displaying a display object according to real-time information, the method comprising:
- acquiring location information of the display object, the location information comprising real-time location information acquired in a previous period and real-time location information acquired in a current period;
- determining a starting point according to the real-time location information acquired in the previous period, and determining a finishing point according to the real-time location information acquired in the current period; and
- displaying the display object as sliding between the starting point and the finishing point, comprising:
  - determining a sliding track of the display object between the starting point and the finishing point, and selecting N spread location points on the sliding track, N being a natural number; and
  - displaying the display object at the starting point, the N spread location points, and the finishing point sequentially for a single-point display duration to achieve a sliding effect,
    - wherein a value of N varies directly with a sliding distance of the display object in the current period and inversely with the single-point display duration.

16. The system according to claim 15, wherein the displaying a display object as sliding between the starting point and the finishing point comprises:
- determining a sliding track of the display object between the starting point and the finishing point, and selecting N spread location points on the sliding track, N being a natural number; and
- displaying the display object at the starting point, the N spread location points, and the finishing point sequentially for a single-point display duration.

17. The system according to claim 15, wherein:
- the display object comprises a user's real-time head image video;
- the location information comprises: an X-axis ratio coordinate corresponding to a rotation angle of a front of the user's real-time head image in a horizontal direction and a Y-axis ratio coordinate corresponding to a rotation angle of the front of the user's real-time head image in a vertical direction; and
- the determining the starting point according to the real-time location information acquired in the previous period, and determining the finishing point according to the real-time location information acquired in the current period comprises: converting, according to a width and a length of a screen, a X-axis ratio coordinate and a Y-axis ratio coordinate of the previous period to location coordinates of the starting point on the screen, and converting, according to the width and the length of the screen, a X-axis ratio coordinate and a Y-axis ratio coordinate of the current period to location coordinates of the finishing point on the screen.

18. The system according to claim 17, wherein the method further comprises: performing verification on the user's real-time head image when the display object moves to a predetermined marked location on the screen, and completing the user's login when the verification is successful.

19. The method according to claim 1, wherein the displaying the display object comprises displaying the display object as sliding, in a curved line, between the starting point and the finishing point.

* * * * *